UNITED STATES PATENT OFFICE.

JAMES TAYLOR CARRICK, OF JOHANNESBURG, TRANSVAAL; ELLIOT ST. MAURICE HUTCHINSON AND ROBERT GOW RALSTON, EXECUTORS TESTAMENTARY OF SAID JAMES TAYLOR CARRICK, DECEASED, ASSIGNORS TO JOHN LAWSON CAMERON, OF SLANGSPRUIT, FOXHILL, NATAL, SOLE EXECUTOR OF BASIL STUART PATTISON.

PREPARATION OF IRON COMPOUNDS.

997,237.      Specification of Letters Patent.    Patented July 4, 1911.

No Drawing.      Application filed June 8, 1909. Serial No. 500,900.

*To all whom it may concern:*

Be it known that I, JAMES TAYLOR CARRICK, geologist, subject of the King of Great Britain, residing at the New Club, Johannesburg, Transvaal, have invented new and useful Improvements in the Preparation of Iron Compounds, of which the following is a specification.

An iron compound suitable for use as a pigment has been prepared by, among others, the following process. To a substantially neutral or slightly acid ferrous solution,—such as the waste pickle liquor obtained in galvanizing after its treatment with scrap iron,—there is added a prescribed fraction of the quantity of ammonia necessary to precipitate the whole of the iron in solution; the mixture is then diluted and oxidized by blowing air into it until it becomes yellow. Subsequently the liquid is boiled, the remaining fraction of the ammonia added and the mixture boiled under pressure; what is described as a blue black magnetic oxid being thereby produced.

The purpose of the present invention is to provide a process for the production of a pigment of this character which may be carried out in the cold and at normal pressures, thus, *inter alia*, doing away with the expensive cast iron boilers which have hitherto been necessary for effecting the final boiling under pressure, and which in practice are very rapidly corroded by the ammonium salts contained in the liquors.

A further purpose is to provide for the economical recovery of hydrochloric acid, in the case where ferrous chlorid liquors are being treated.

The specification of the above described process points to the conclusion that the yellow product obtained by oxidation after the first precipitation by ammonia is substantially ferric hydrate, and similarly upon adding the rest of the ammonia ferrous hydrate is produced. Thus the penultimate product would appear to be a mixture of ferric hydrate and ferrous hydrate, which substances are combined by the boiling under pressure.

In the specification of the above described process it is stated that if all the ferrous liquor were saturated in the first instance only red or yellow oxid would be obtained, but the present invention is based upon the discovery that by the addition of ammonia in the first instance in sufficiently large excess, a single and different reaction is brought about without the aid of heat or pressure, the immediate product of which is a blue black magnetic oxid, or hydrate of iron, or combination of oxid and hydrate. The simplest method of carrying out the present process thus consists in adding the ammonia—as hydrate or carbonate—to the slightly acid solution, in large excess relatively to the total acid present, whether combined or uncombined. The minimum possible excess is found to vary in accordance with the degree of concentration of iron in the total amount of liquor which is to be oxidized. Thus with 3 per cent. of iron in the total solution, the minimum amount of ammonia required is twice the equivalent quantity necessary to liberate the iron; and with higher precentages of iron more ammonia equivalents are required. The limiting case is found to occur with about 1½ per cent. of iron, in which case the reaction may be effected with about 1½ equivalents of ammonia. With less than 1½ per cent. of iron, the requisite ammonia equivalents increase at a very rapid rate. After the addition of the ammonia, the solution is thoroughly oxidized, as by aspirating air through it for about 24 hours, the ferroferric compound being thereby precipitated. The above operations are most advantageously carried out in the cold and at normal pressure. It is found however that by boiling the ammoniacal solution prior to the removal of the precipitate therefrom the stability of the resulting pigment is increased. To complete the process in a commercial sense, the ferroferric precipitate is removed by an electromagnet or by filtration, washed, and dried in the absence of air. The resultant product is a blue black magnetic pigment. The ammonia in the filtrate is recovered or regenerated by any known and convenient method such as the evaporation of the solution or the addition of lime, boiling of the solution and collection in towers of the ammonia gas so driven off.

In the case where the original liquor is a solution of chlorid of iron, the hydrochloric acid is recovered as follows. Lime having been added to set free the ammonia as stated above, or being added specially if necessary, and a solution of calcium chlorid thereby produced, sulfuric acid is added thereto in slight excess. By this means calcium sulfate and free hydrochloric acid are formed, which mixture is evaporated at about 130° C., by or while drawing air over it. It is found that by this means no trace of hydrochloric acid remains with the slightly acid residual hydrated calcium sulfate, when tested with silver nitrate solution. The temperature of 130° C. referred to is below that at which calcium sulfate dehydrates, and above that at which hydrochloric acid evaporates at normal pressure, but other temperatures between the corresponding limits may be used with reduced pressure. The hydrochloric acid which distils over after the excess water is substantially of the strength required for pickling purposes. The hydrated calcium sulfate produced by this means forms a marketable by-product.

An important advantage of the present process is that while no difficulty is met in producing the required degree of oxidation, there is on the other hand no danger of overblowing, as the aspiration can be continued, in presence of the excess ammonia, for days after the reaction is complete, without alteration of the black precipitate; and no tests are required to be made during the operation, as in some known processes.

The process is applicable to the treatment of waste liquor resulting from the pickling of iron prior to galvanizing, or other ferrous solutions, whether waste or prepared specially for the purpose of the invention.

In my co-pending application Serial No. 462444, I have described and claimed the herein described reaction as applied to the separation of iron and nickel out of liquor obtained by the digestion of nickeliferous mattes. To such separation process no claim is made in the present application.

What I claim, and desire to secure by Letters Patent is:—

1. The process of treating a ferrous solution for the production of a blue-black pigment which consists in adding to the acid or neutral ferrous solution an ammonium compound in large excess and afterward subjecting the mixture to prolonged oxidation, said process being carried out entirely in the cold and under normal pressure.

2. The process of treating a ferrous solution for the production of blue-black pigment which consists in adding to the acid or neutral ferrous solution ammonium hydrate in large excess and afterward subjecting the mixture to prolonged oxidation, said process being carried out entirely in the cold and under normal pressure.

3. The process of treating a ferrous solution for the production of blue-black pigment which consists in adding to the acid or neutral ferrous solution ammonium hydrate in large excess, subjecting the mixture to prolonged oxidation, separating the precipitate from the solution and drying it in the absence of air.

In testimony whereof I have signed my name to this specification in the presence of two subscribing witnesses.

JAMES TAYLOR CARRICK.

Witnesses:
 ALFRED L. SPOOR,
 W. HILLMAN NULLUH.